March 29, 1927.

L. T. GARDNER 1,622,866

DEVICE FOR RAISING SUNKEN SUBMARINES

Filed April 7, 1926  4 Sheets-Sheet 1

Inventor
Leonard T. Gardner,
By E. Hatton Benington.
Attorney

March 29, 1927.

L. T. GARDNER 1,622,866

DEVICE FOR RAISING SUNKEN SUBMARINES

Filed April 7, 1926 4 Sheets-Sheet 2

Inventor

Leonard T. Gardner,
By E. Walton Bennington.
Attorney

March 29, 1927.
L. T. GARDNER
DEVICE FOR RAISING SUNKEN SUBMARINES
Filed April 7, 1926       4 Sheets-Sheet 3
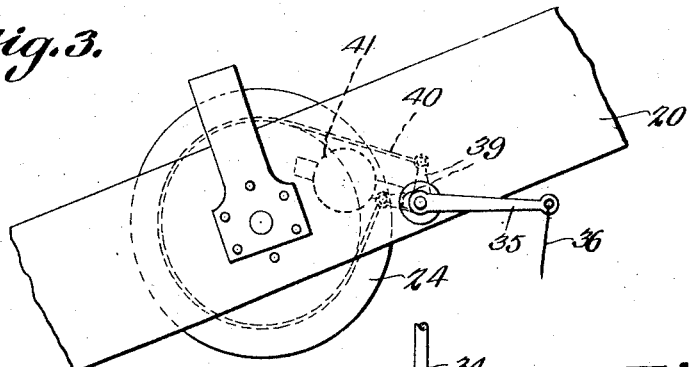
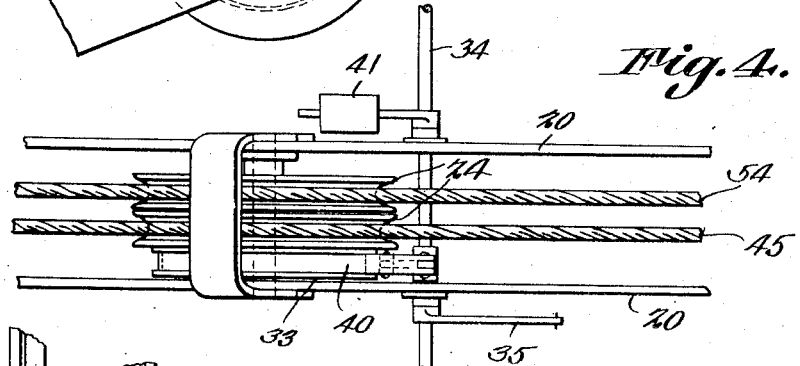
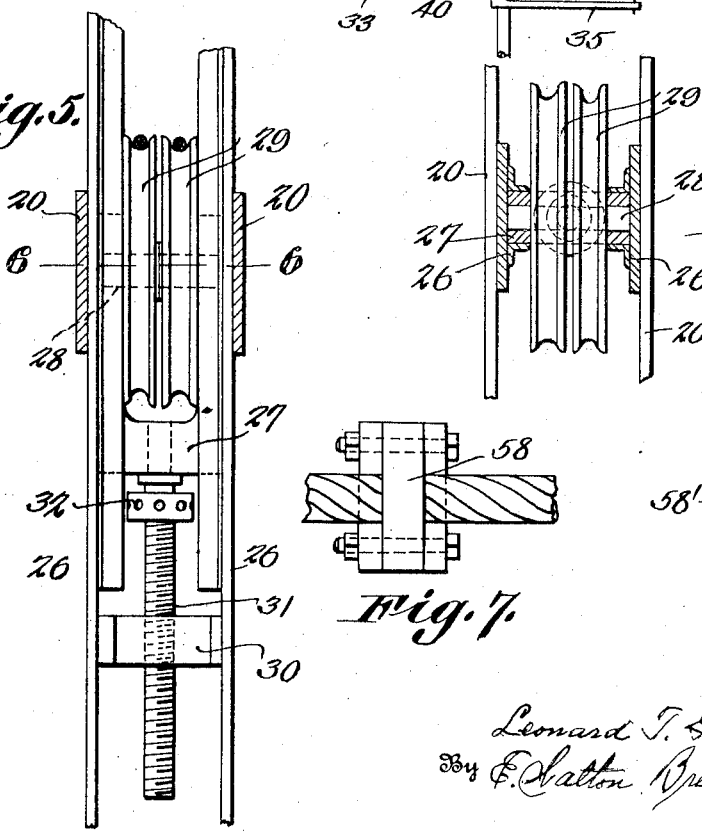
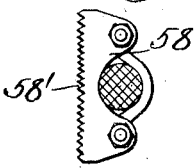
Inventor
Leonard T. Gardner
By E. Hatton Brewington
Attorney March 29, 1927.
L. T. GARDNER
1,622,866
DEVICE FOR RAISING SUNKEN SUBMARINES
Filed April 7, 1926  4 Sheets-Sheet 4
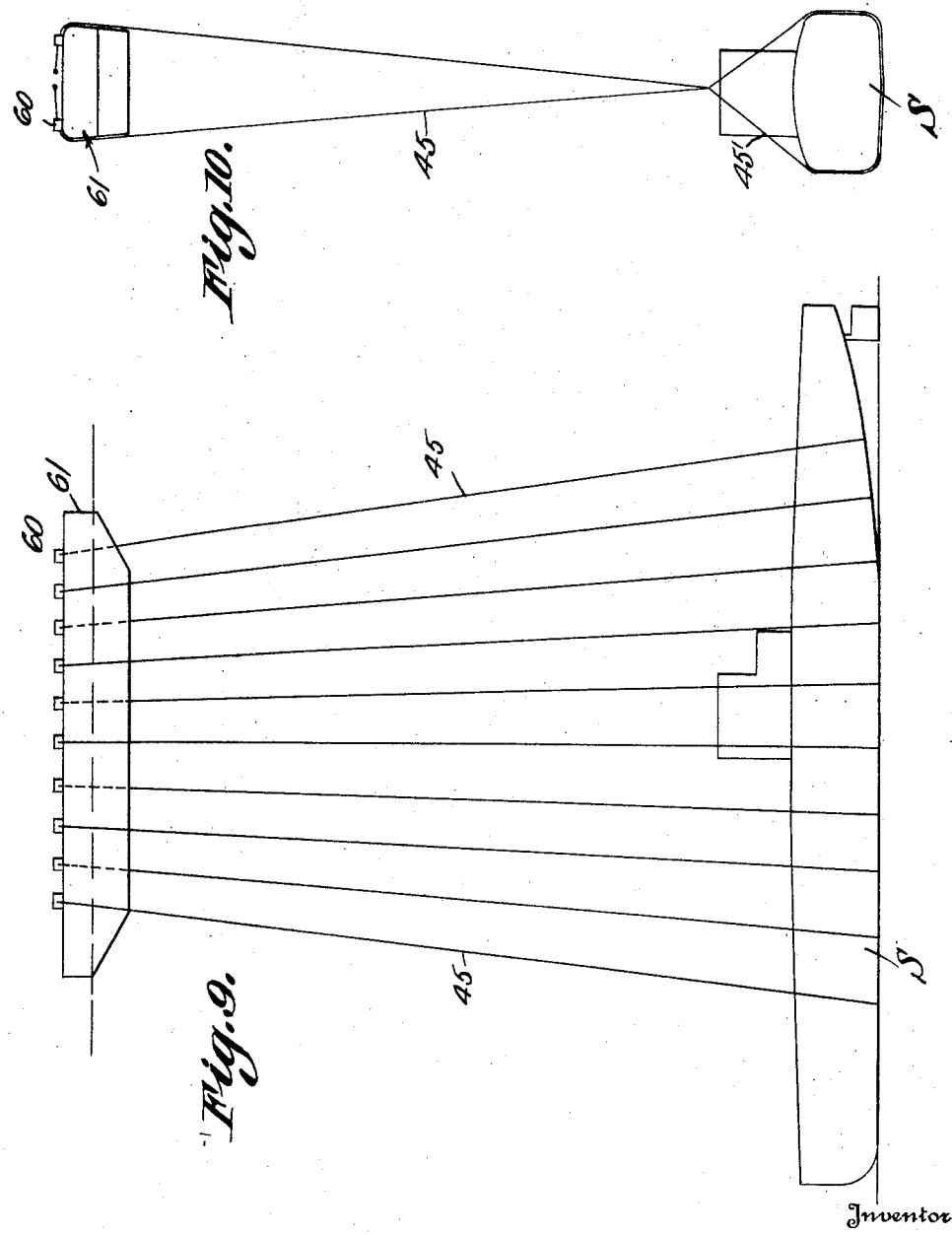

Patented Mar. 29, 1927.

1,622,866

UNITED STATES PATENT OFFICE.

LEONARD T. GARDNER, OF BALTIMORE, MARYLAND, ASSIGNOR OF ONE-HALF TO CHARLES A. JORDING, OF BALTIMORE, MARYLAND.

DEVICE FOR RAISING SUNKEN SUBMARINES.

Application filed April 7, 1926. Serial No. 100,211.

This invention relates to hoisting devices for submerged or sunken bodies such as submarines, ships and the like and is preferably termed a derrick ship.

One important object of the invention is to improve the general construction of devices of this character.

A second important object of the invention is to provide an improved device of this class wherein the heavy hoisting engines frequently used will be dispensed with.

A third important object of the invention is to provide a novel construction of derrick ship which is so arranged that underwater salvage operations may be carried on in a heavy sea with little or no danger of parting the hoisting cables.

A fourth important object of the invention is to provide a novel floatable counterweight arrangement for use in connection with such a derrick ship.

A fifth important object of the invention is to provide novel means for regulating the lengths of certain counterbalancing cables used herewith and for regulating the tensions of individual cables so that all may be equally tensioned.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 3 is a detail side elevation of a portion of one of the cable supporting arches used herein and showing the brake mechanism for certain sheaves.

Figure 4 is a plan view of the mechanism shown in Figure 3.

Figure 5 is a detail elevation through the top of an arch showing the cable tensioning means carried thereby.

Figure 6 is a detail section on the line 6—6 of Figure 5.

Figure 7 is a detail back view of an antishipping device used in connection with the hoisting cables.

Figure 8 is a side view of the device shown in Figure 7.

Figure 9 is a diagrammatic side elevation showing a buoy used herewith and the manner of its use.

Figure 10 is an end view of the arrangement shown in Figure 9.

Figure 1:
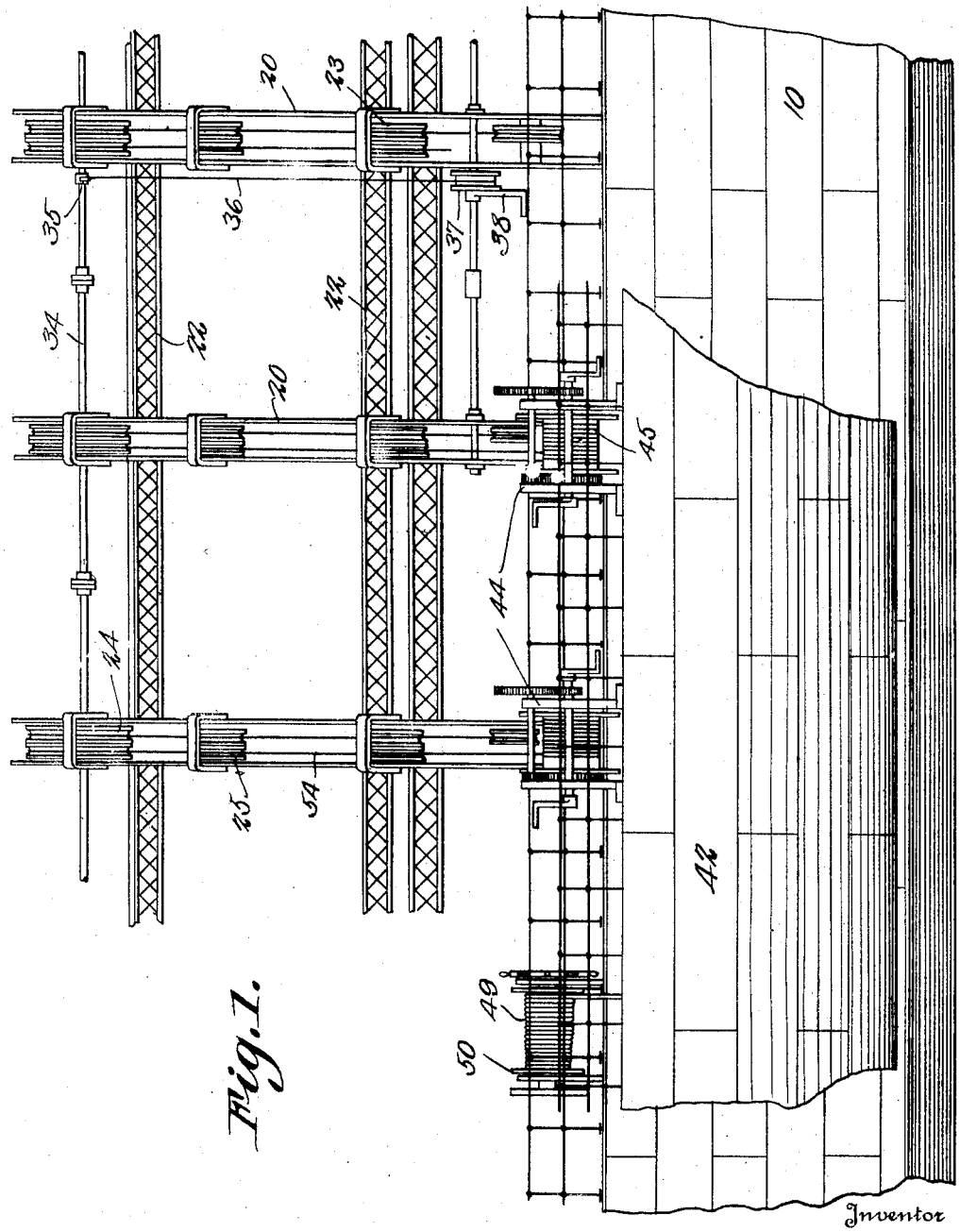
Figure 1 is a partial side elevation of a derrick ship and counterbalancing pontoon or float constructed in accordance with this invention.

In carrying out the objects of this invention there is provided a hull 10 which may be of any desired length, width and normal or running draft that may be found best adapted to the purpose, the device being capable of construction in a wide range of sizes without departing from the principles of the invention. Similarly, the shape of the hull may be such as is found best adapted for the purpose. This hull is here shown as provided with a lower deck 11 and an upper deck 12 though it is obvious that the deck arrangements, as well as other details may also be varied. Beneath the lower deck is provided, on each side of the hull, a series of water ballast tanks 13 each having a seacock 14 by which water ballast may be admitted to selected tanks. On the lower deck is one or more water pumps 15 from which extend valved suction pipes 16 leading each to the bottom portion of a respective tank 13, an outflow or delivery pipe 17 leading from the pump outboard of the hull. By this means water ballast in any tank 13 may be pumped therefrom.

Extending upwardly and outwardly from each side of the hull is a series of struts 18 arranged in pairs athwartships and extending upwardly from the deck at the feet of each pair is an A-frame 19. These struts and A-frames support the arched members or arches 20, suitable bracing 21 connecting the arches, struts and A-frames together, athwartships and longitudinal bracings 22 being also employed to tie the several arches and supports to adjacent similar parts. At each end of each arch is a pair of sheaves 23 and similarly at the top of each side of each A-frame is a pair of sheaves 24. Between the sheaves 23 and 24 the arch supports idler sheaves 25. Extending upwardly from the top of the A-frame and secured to the arch members is a pair of guides 26 wherein is slidably mounted a cross head 27 carrying a shaft 28 whereon is mounted a pair of sheaves 29. Connecting the lower ends of the guides is a cross bar 30 having a threaded opening therein for the reception of a jack screw 31 equipped with a capstan head 32. The upper end of the jack screw engages the cross head so that rotation of this screw effects vertical adjustment of the sheaves 29. At least one of each pair of sheaves has secured to its side a brake drum 33 and extending through the arches is a shaft 34 whereon is fixed an arm 35 connected by a cable 36 with a winding drum 37 supported on the A-frame and having a hand operated crank 38. On the shaft 34 is also fixed, opposite each brake drum, a pair of diverging arms 39 to which are secured the ends of a brake band 40 surrounding the drum 33, the constructions thus forming band brakes operable by the cranks 38. Counterweights 41 of the usual character are employed to normally hold the brakes relaxed.

The pontoon or submersible counterweight is provided with a hull 42 which is substantially cylindrical in general form, the upper side or deck being flat as shown at 43. On this deck is mounted a series of hand operated geared winches 44 corresponding in number and spacing to the arches on the hull 10. Each of these winches has the usual winding drum and on each drum is wound a cable 45 which passes over one of each pair of sheaves and terminates at its free end in a sling 45' adapted to receive the submarine or other device to be raised. This hull 42 is preferably divided by athwartships bulkheads into three or more water tight compartments each of which is provided with an outwardly opening flood valve 46 normally held closed by a spring 47 of bronze or other suitable non-corrosive material. Each flood valve has connected thereto a control cable 48 which leads to the ship and is operated by hand from the ship's deck. Also leading to each compartment of the pontoon is an air pipe 49 which is normally wound on a reel 50 and which receives air from a suitable air compressor (not shown) located in a convenient place on the ship. Each compartment is further provided in its bottom with an outwardly opening check valve 51.

On the upper deck 12 beneath each A-frame is a hoisting engine 52 having a drum 53 whereon is wound a cable 54 which is led over the remaining sheaves of the arch after passing beneath an idler 55. This cable terminates in a hook 56 which may carry a sling such as 45' or may be hooked in one of the eye bolts 57 carried by the strut 18 on one side of the ship.

It is to be noted that each sling is provided with a quantity of dogs 58 having teeth 58' so that once the slings are positioned around the submarine S or other sunken ship they will not slip off. Suitable ballast 59 is provided for the pontoon.

Figure 2:
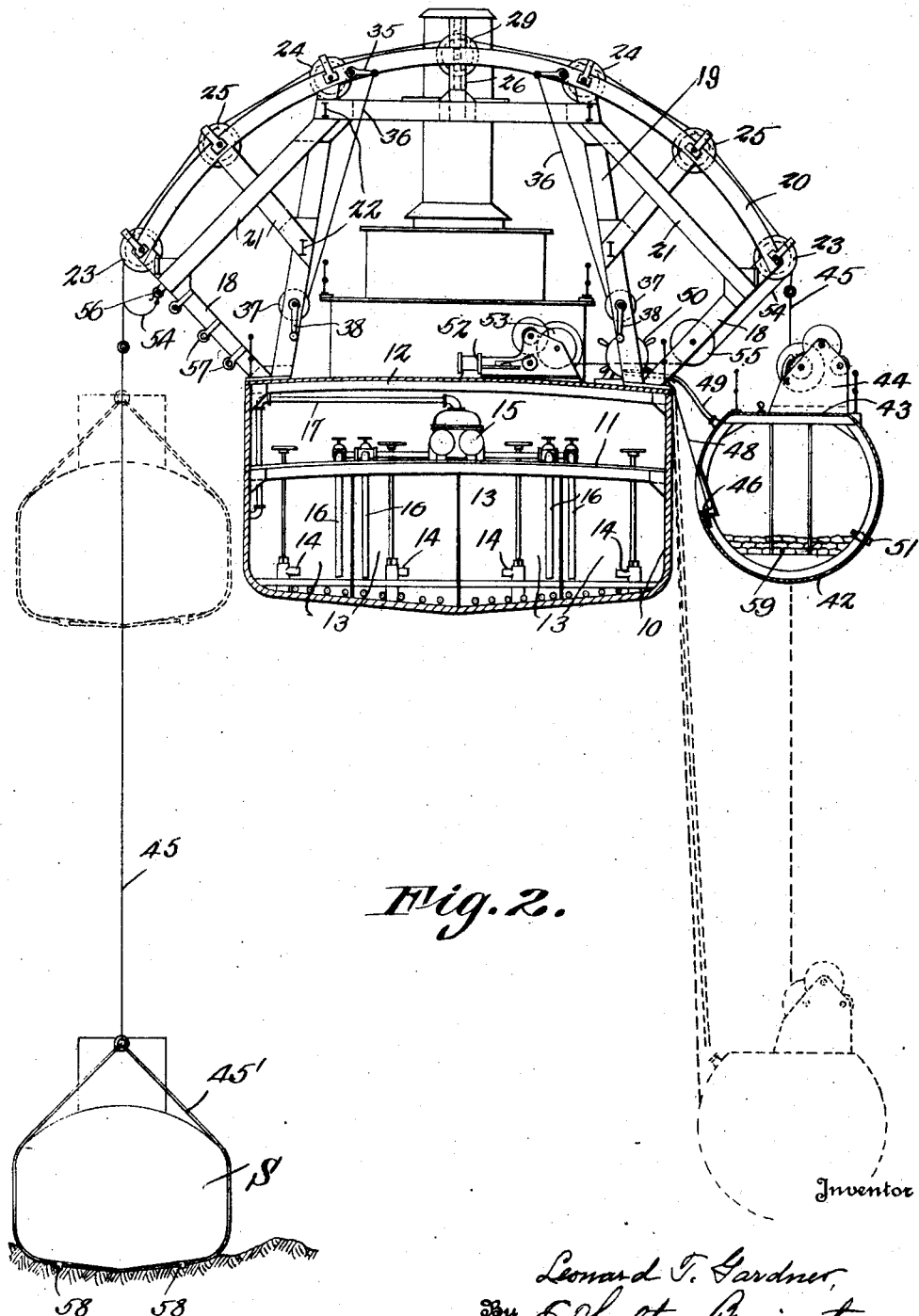
Figure 2 is a transverse section through such a ship and pontoon showing the action in raising a sunken submarine.

In operation suppose it is desired to raise a large sunken submarine such as is shown at S. The ship is moved into position over and slightly to one side of the submarine and the sea-cocks 14 are opened to admit water to the ballast tanks 13 and thus lower the hull in the water. The winches 44 are now operated to allow the cables 45 to unwind and the slings 45' to sink in the water. By suitable diving operations these slings are positioned around the submarine as shown in Figure 2. The pump 15 is now started and the tanks 13 emptied. This causes the ship to have greater flotation and it will rise, even tension being maintained on the cables 45 by proper manipulation of the jack screws. If the pontoon is heavier than the submarine the latter will tilt off the sea bottom before the pontoon lifts from the water but, if the submarine is too heavy the pontoon will tend to lift but this is prevented by opening one or more of the flood valves 46 so that one or both ends of the pontoon may diminish in flotative effect and thus increase in effective weight. Upon the tanks 13 being fully pumped out the flood valves 46 are now opened until enough water is admitted to the pontoon to cause the effective weight of the latter to over-balance the dead weight of the submarine. Under these circumstances the submarine will begin to rise, its rate of ascent being regulated by the brakes. After the submarine has been lifted as far as the downward movement of the pontoon will permit suitable slings (not shown) may be passed around the submarine and secured to the eyes 57, the ballast tanks 13 on the side opposite the submarine being sufficiently flooded to keep the ship on an even keel. The water in the pontoon may then be blown out by air through the pipes 49 whereupon the latter will rise. Upon the pontoon reaching the surface the winches 44 are manipulated to take up the slack of the cables 45 and, if the submarine has not been raised sufficiently, the operation may be repeated until the submarine is in desired position alongside of the ship where it may be secured. It is to be noted that the ship will be provided with suitable air and water pumps (not shown) to free the submarine from any water which has entered its hull.

Under some circumstances the hoisting engines 52 may be used to give additional lift to the submarine and where the weight to be lifted is small the use of the pontoon may be omitted, all lifting being done by the hoisting engines.

It will be noted that the use of the pontoon as a lifting means when flooded will not be affected by the rolling of the ship in ordinary rough weather since such rolling will simply cause the cables to run back and forth on the sheaves. However, if the weather becomes too rough the ends of the cables may be released from the drums and secured to clamps 60 on an elongated boat like buoy 61 as in Figures 9 and 10.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A device of the kind described, including a ship having a hull, a plurality of cables extending athwartships of said hull, sheaves supported by the hull on which said cables run, a submergible pontoon counterweight at one side of said hull, means carried by the pontoon and having one end of each cable connected thereto, flood valves for said pontoon controllable from the ship, and means controllable from the ship for expelling admitted water from the pontoon.

2. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon controllable from the ship, and means controllable from the ship for expelling admitted water from the pontoon.

3. A device of the kind described, including a ship having a hull, a plurality of cables extending athwartships of said hull, sheaves supported by the hull on which said cables run, a submergible pontoon counterweight at one side of said hull, means carried by the pontoon and having one end of each cable connected thereto, flood valves for said pontoon, means normally holding said valves closed, operating cables connected to the valves and leading to said ship, and means controllable from the ship for expelling admitted water from the pontoon.

4. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, and means controllable from the ship for expelling admitted water from the pontoon.

5. A device of the kind described, including a ship having a hull, a plurality of cables extending athwartships of said hull, sheaves supported by the hull on which said cables run, a submergible pontoon counterweight at one side of said hull, means carried by the pontoon and having one end of each cable connected thereto, flood valves for said pontoon, means normally holding said valves closed, operating cables connected to the valves and leading to said ship, outwardly opening check valves carried by the pontoon near the bottom thereof, air forcing means on the ship, and air hose leading from the air forcing means and opening into the upper part of said pontoon.

6. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, outwardly opening check valves carried by the pontoon near the bottom thereof, air forcing means on the ships, and air hose leading from the air forcing means and opening into the upper part of said pontoon.

7. A device of the kind described, including a ship having a hull, a plurality of cables extending athwartships of said hull, sheaves supported by the hull on which said cables run, a submergible pontoon counterweight at one side of said hull, means carried by the pontoon and having one end of each cable connected thereto, flood valves for said pontoon, means normally holding said valves closed, operating cables connected to the valves and leading to said ship, means controllable from the ship for expelling admitted water from the pontoon, and braking means associated with certain of said sheaves.

8. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, means controllable from the ship for expelling admitted water from the pontoon, and braking means associated with certain of said sheaves.

9. A device of the kind described, including a ship having a hull, a plurality of cables extending athwartships of said hull, sheaves supported by the hull on which said cables run, a submergible pontoon counterweight at one side of said hull, means carried by the pontoon and having one end of each cable connected thereto, flood valves for said pontoon, means normally holding said valves closed, operating cables connected to the valves and leading to said ship, outwardly opening check valves carried by the pontoon near the bottom thereof, air forcing means on the ship, air hose leading from the air forcing means and opening into the upper part of said pontoon, and braking means associated with certain of said sheaves.

10. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, outwardly opening check valves carried by the pontoon near the bottom thereof, air forcing means on the ships, air hose leading from the air forcing means and opening into the upper part of said pontoon, and breaking means associated with certain of said sheaves.

11. A device of the kind described, including a ship having a hull, a plurality of cables extending athwartships of said hull, sheaves supported by the hull on which said cables run, a submergible pontoon counterweight at one side of said hull, means carried by the pontoon and having one end of each cable connected thereto, flood valves for said pontoon, means normally holding said valves closed, operating cables connected to the valves and leading to said ship, means controllable from the ship for expelling admitted water from the pontoon, braking means associated with certain of said sheaves, and cable tensioning means on the ship associated with certain of said sheaves.

12. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, means controllable from the ship for expelling admitted water from the pontoon, braking means associated with certain of said sheaves, and cable tensioning means on the ship associated with certain of said sheaves.

13. A device of the kind described, including a ship having a hull, a plurality of cables extending athwartships of said hull, sheaves supported by the hull on which said cables run, a submergible pontoon counterweight at one side of said hull, means carried by the pontoon and having one end of each cable connected thereto, flood valves for said pontoon, means normally holding said valves closed, operating cables connected to the valves and leading to said ship, outwardly opening check valves carried by the pontoon near the bottom thereof, air forcing means on the ship, air hose leading from the air forcing means and opening into the upper part of said pontoon, braking means associated with certain of said sheaves, and cable tensioning means on the ship associated with certain of said sheaves.

14. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, outwardly opening check valves carried by the pontoon near the bottom thereof, air forcing means on the ships, air hose leading from the air forcing means and opening into the upper part of said pontoon, braking means associated with certain of said sheaves, and cable tensioning means on the ship associated with certain of said sheaves.

15. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon controllable from the ship, means controllable from the ship for expelling admitted water from the pontoon, and arch members supporting said sheaves and supported on the ship to extend athwartships with the ends outboard of the ship.

16. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, means controllable from the ship for expelling admitted water from the pontoon, and arch members supporting said sheaves and supported on the ship to extend athwartships with the ends outboard of the ship.

17. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, means controllable from the ship for expelling admitted water from the pontoon, braking means associated with certain of said sheaves, and arch members supporting said sheaves and supported on the ship to extend athwartships with the ends outboard of the ship.

18. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, outwardly opening check valves carried by the pontoon near the bottom thereof, air forcing means on the ships, air hose leading from the air forcing means and opening into the upper part of said pontoon, braking means associated with certain of said sheaves, cable tensioning means on the ship associated with certain of said sheaves, and arch members supporting said sheaves and supported on the ship to extend athwartships with the ends outboard of the ship.

19. A device of the kind described, including a ship having a hull, a plurality of cables extending athwartships of said hull, sheaves supported by the hull on which said cables run; a submergible pontoon counterweight at one side of said hull, winches carried by the pontoon and each having one end of a respective cable wound thereon, flood valves for said pontoon controllable from the ship, means controllable from the ship for expelling admitted water from the pontoon, arch members supporting said sheaves and supported on the ship to extend athwartships with the ends outboard of the ship, other sheaves arranged beside the first sheaves, hoisting engines on the ship having winding drums, and cables each having one end wound on a respective drum and leading over the last mentioned sheaves.

20. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, means controllable from the ship for expelling admitted water from the pontoon, arch members supporting said sheaves and supported on the ship to extend athwartships with the ends outboard of the ship, other sheaves arranged beside the sheaves, hoisting engines on the ship having winding drums, and cables each having one end wound on a respective drum and leading over the last mentioned sheaves.

21. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, means controllable from the ship for expelling admitted water from the pontoon, braking means associated with certain of said sheaves, arch members supporting said sheaves and supported on the ship to extend athwartships with the ends outboard of the ship, other sheaves arranged beside the first sheaves, hoisting engines on the ship having winding drums, and cables each having one end wound on a respective drum and leading over the last mentioned sheaves.

22. A device of the kind described, including a ship having a hull, a plurality of cables extending athwartships of said hull, sheaves supported by the hull on which said cables run, a submergible pontoon counterweight at one side of said hull, winches carried by the pontoon and each having one end of a respective cable wound thereon, flood valves for said pontoon, means normally holding said valves closed, operating cables connected to the valves and leading to said ship, outwardly opening check valves carried by the pontoon near the bottom thereof, air forcing means on the ships, air hose leading from the air forcing means and opening into the upper part of said pontoon, braking means associated with certain of said sheaves, cable tensioning means on the ship associated with certain of said sheaves, arch members supporting said sheaves and supported on the ship to extend athwartships with the ends outboard of the ship, other sheaves arranged beside the first sheaves, hoisting engines on the ship having winding drums, and cables each having one end wound on a respective drum and leading over the last mentioned sheaves.

In testimony whereof I affix my signature.

LEONARD T. GARDNER.